US008662439B2

(12) United States Patent
Fortenbaugh et al.

(10) Patent No.: US 8,662,439 B2
(45) Date of Patent: Mar. 4, 2014

(54) SYSTEM AND METHOD FOR LIMITING CYCLIC CONTROL INPUTS

(71) Applicant: Bell Helicopter Textron Inc., Fort Worth, TX (US)

(72) Inventors: Robert L. Fortenbaugh, Pantego, TX (US); Jose Manuel Rodriguez, Fort Worth, TX (US); Ronald Lorenz Kisor, Coppell, TX (US); Robert Blyth, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/949,814

(22) Filed: Jul. 24, 2013

(65) Prior Publication Data

US 2013/0334361 A1 Dec. 19, 2013

Related U.S. Application Data

(60) Division of application No. 13/224,750, filed on Sep. 2, 2011, now Pat. No. 8,496,199, which is a continuation-in-part of application No. PCT/US2011/043724, filed on Jul. 12, 2011.

(51) Int. Cl.
*B64C 27/57* (2006.01)
*B64C 27/00* (2006.01)
(52) U.S. Cl.
USPC ........................................ 244/17.13; 244/195
(58) Field of Classification Search
USPC ........... 244/17.11, 17.13, 194, 195, 227, 228; 73/178 H
See application file for complete search history.

(56) References Cited

U.S. PATENT DOCUMENTS

| 2004/0093130 | A1 | 5/2004 | Osder et al. |
| 2005/0042094 | A1* | 2/2005 | Occhiato et al. ............... 416/61 |
| 2006/0054737 | A1 | 3/2006 | Richardson |
| 2010/0116925 | A1 | 5/2010 | Segal |

FOREIGN PATENT DOCUMENTS

WO 2009025909 A2 2/2009

OTHER PUBLICATIONS

Extended European Search Report dated Feb. 28, 2012 from counterpart EP Application No. 11188082.9.
European Decision to Grant dated May 24, 2013 from counterpart EP Application No. 11188082.9.
Notice of Allowance dated Apr. 2, 2013 from counterpart U.S. Appl. No. 13/224,750.

* cited by examiner

*Primary Examiner* — Tien Dinh
*Assistant Examiner* — Richard R Green
(74) *Attorney, Agent, or Firm* — James E. Walton; Richard G. Eldredge

(57) ABSTRACT

A control system having a first loop configured to provide a longitudinal blowback value of a rotor blade during flight and a second loop associated with the first loop, the second loop being configured to provide a design maximum total flapping value and a lateral flapping value. A method includes calculating a flight control limit from the design maximum total flapping value and the lateral flapping value. An upper longitudinal cyclic control limit is calculated by adding the flight control limit to the longitudinal blowback value. A lower longitudinal cyclic control limit is calculated by subtracting the flight control limit from the longitudinal blowback value.

8 Claims, 7 Drawing Sheets

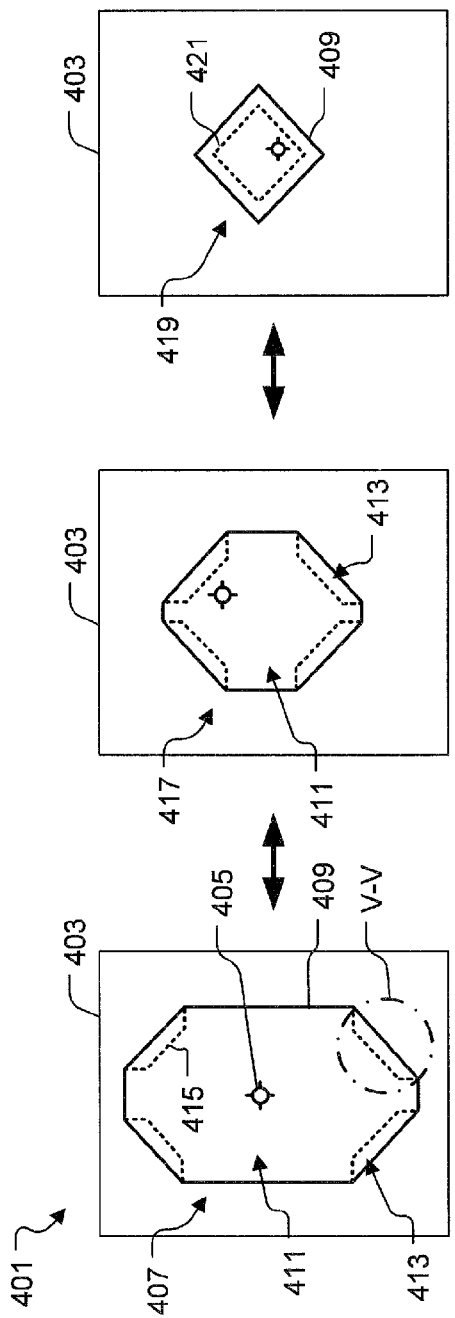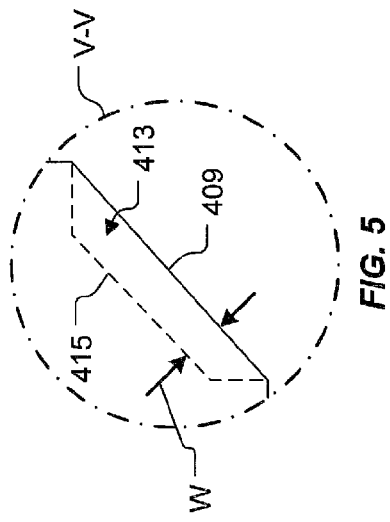

SYSTEM AND METHOD FOR LIMITING CYCLIC CONTROL INPUTS

BACKGROUND

1. Field of the Present Description

The present application relates generally to flight control systems, and more specifically, to an aircraft flight control system for rotor blade flapping.

2. Description of Related Art

All rotor systems are subject to dissymmetry of lift in forward flight. During hover, the lift is equal across the entire rotor disk. As the helicopter gains airspeed, the advancing rotor blade develops greater lift because of the increased airspeed. For example, rotor blades at hover move at 300 knots and in forward flight at 100 knots the advancing blades move at a relative speed of 400 knots and while the retreating blades move at 200 knots. This has to be compensated for in some way, or the helicopter would corkscrew through the air doing faster and faster snap rolls as airspeed increased.

Dissymmetry of lift is compensated for by blade flapping. Because of the increased airspeed (and corresponding lift increase) on the advancing rotor blade, the rotor blade flaps upward. Decreasing speed and lift on the retreating rotor blade causes the blade to flap downward. This induced flow through the rotor system changes the angle of attack on the rotor blades and causes the upward-flapping advancing rotor blade to produce less lift, and the downward-flapping retreating rotor blade to produce a corresponding lift increase. Some rotor system designs require that flapping be limited by flapping stops which prevent damage to rotor system components by excessive flapping. In addition to structural damage, aircraft control can be compromised if the rotor flaps into the stop. Thus it becomes incumbent on the aircraft designer to control flapping and warn of this hazardous condition. This application addresses this requirement.

Conventional devices and methods to control flapping include providing a display showing the longitudinal stick position of the aircraft. In one embodiment, the display is a simple green tape that grows from a center position. Tic marks associated with the display represent 10 percent control margin remaining. Common problems associated with this conventional device include: there is no interface to display the control power remaining before a hazardous flapping condition is reached. Although the foregoing developments represent great strides in the area of aircraft displays, many shortcomings remain.

DESCRIPTION OF THE DRAWINGS

The novel features believed characteristic of the application are set forth in the appended claims. However, the invention itself, as well as a preferred mode of use, and further objectives and advantages thereof, will best be understood with reference to the following detailed description when read in conjunction with the accompanying drawings, wherein:

FIGS. 4A-4C are front views of a display of the control system according to the preferred embodiment of the present application;
FIG. 5 an enlarged view of a portion of the display of FIG. 4A taken at VI-VI.

Figure 1:
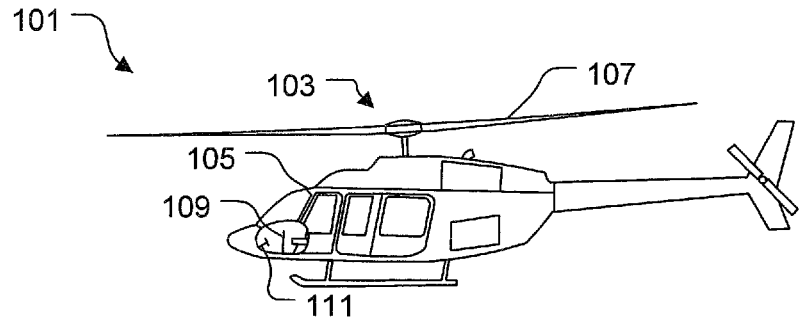
FIG. 1 is a side view of a rotary aircraft.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION

The system and method of the present application overcomes the abovementioned problems commonly associated with conventional aircraft control systems. The control system comprises a subsystem adapted to modifying predetermined flight control limits for a particular aircraft. The subsystem determines whether the aircraft is operating within or near an impending hazardous flight condition, which, in the exemplary embodiments, are conditions where excessive blade flapping occurs. The control system further comprises a display having a symbol, i.e., a pipper, which identifies displacement of the pilot's cyclic controller combined with pitch control feedbacks and/or pedal displacement and yaw control feedbacks relative to the flight control limits. Further description and illustration of the control system and method is provided in the figures and disclosure below.

It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
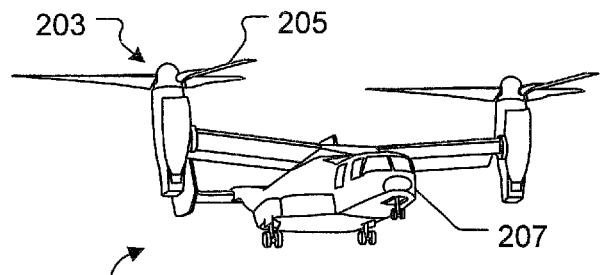
FIG. 2 is an oblique view of a tiltrotor aircraft.

Referring now to the drawings, FIGS. 1 and 2 show two different rotary aircraft utilizing the flight control system of the present application. FIG. 1 shows a side view of a helicopter 101, while FIG. 2 shows an oblique view of a tiltrotor aircraft 201. The flight control system is preferably utilized in tiltrotor aircraft 201 during low speeds and with a fixed lateral cyclic. However, it will be appreciated that the control system is easily and readily adaptable for use with other types of rotary aircraft, i.e., helicopter 101, operating at various speeds and with or without a fixed lateral cyclic control.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107, thus providing lateral and longitudinal flight direction, and/or manipulate pedals 111 for controlling yaw direction. The system of the present application is preferably carried within fuselage 105, thereby providing viewing access to the pilot during flight.

Tiltrotor aircraft 201 includes two or more rotary systems 203 carried by rotatable nacelles. The rotatable nacelles enable aircraft 201 to takeoff and land like a conventional helicopter, thus the rotary systems of tiltrotor 201 are susceptible to excessive flapping of the rotor blades 205 caused by control of the rotor blades, rotor system rotation, and the rotor operating environment such as wind speed and direction. In the preferred embodiment, the control system of the present application is carried within fuselage 207 for assisting the pilot during flight. It should be understood that, like helicopter 101, tiltrotor aircraft 201 comprises a cyclic controller and pedals for manipulating lateral, longitudinal, and yaw control.

For ease of description, some of the required systems and devices operably associated with the present control system are not shown, i.e., sensors, connectors, power sources, mounting supports, circuitry, software, and so forth, in order to clearly depict the novel features of the system. However, it should be understood that the system of the present application is operably associated with these and other required systems and devices for operation, as conventionally known in the art, although not shown in the drawings.

Figure 3A:
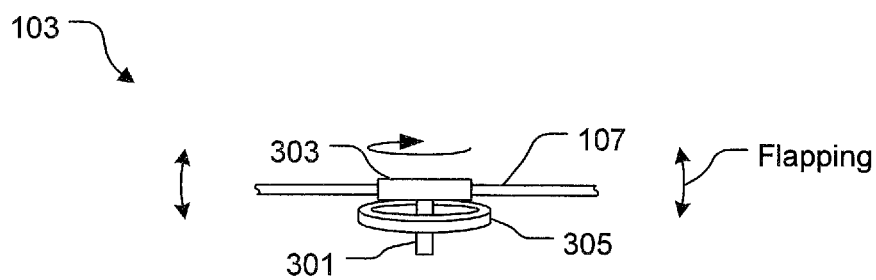
FIGS. 3A and 3B are oblique views of a rotary system.
Figure 3B:
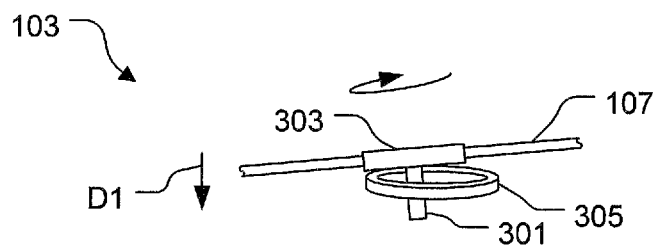

Referring to FIGS. 3A and 3B in the drawings, oblique views of rotary system 103 are shown. FIG. 3A shows rotary system 103 during normal operation, while FIG. 3B shows rotary system 103 during hazardous flight conditions, i.e., the rotary system experiencing excessive flapping. Rotary system 103 comprises a mast 301 rotatably attached to rotor blades 107 via a rotor yoke 303. One or more restraints 305 and/or other nearby structures are positioned alongside mast 301. In the exemplary embodiment, restraints 305 are conventional "stops" adapted to restrain the movement of the hub. It should be understood that both helicopter 101 and tiltrotor 201, along with other types of rotary aircraft, are susceptible to excessive flapping, which could result in damage to the rotary system.

During flight, the rotation of mast 301 combined with the pitching of rotor blades 107 causes flapping, as depicted with vertical arrows. Excessive flapping can cause yoke 303 to tilt in direction D1, as indicated with the vertical arrow, which in turn could cause the yoke to come into contact with restraint 305, resulting in damage to components of the rotor system and/or restraint 305, and in some scenarios, resulting in catastrophic failure. It will be appreciated that one of the novel features of the control system of the present application is to assist the pilot in controlling flight of the aircraft to avoid contact between yoke 303 and restraint 305.

Referring now to FIGS. 4A-4C in the drawings, control system 401 according to the preferred embodiment of the present application is shown. System 401 comprises a display 403 for displaying flight control limits on a screen. FIG. 4A shows system 401 during normal flight when certain portions of the design flight control envelope are limited by a control power management subsystem (CPMS), while FIG. 4C shows the flight control envelope being morphed as the aircraft approaches hazardous flight conditions. FIG. 4B shows the transition, i.e., morphing of the flight control envelope, as the aircraft moves relative to hazardous flight conditions.

Display 403 is provided with a symbol 405, i.e., a pipper, which, in the preferred embodiment, displays displacement of the cyclic controller 109 and pedal 111. In the preferred embodiment, vertical pipper motion on display 403 represents the symmetric cyclic or, equivalently, the displacement of the longitudinal cyclic controller 109, while horizontal pipper motion on the display 403 represents the differential left-right rotor cyclic, or equivalently, control pedal 111. However, it will be appreciated that alternative embodiments of display 403 could easily be adapted to include other flight parameters and/or different controller movement in lieu of the preferred embodiment. For example, system 401 could be adapted to display a symbol indicating movement of both the cyclic lateral and the cyclic longitudinal movement in lieu of the preferred embodiment. Symbol 405 cues the pilot as to the cyclic stick or pedal inputs required to increase the margin from the impending hazardous condition. It should be appreciated that the pipper position in FIG. 4B cues the pilot that left pedal and aft stick will increase the control margin.

It should be understood that display 403 is adapted to display both yaw and pitch control of the aircraft. For example, the vertical axis of display 403 represents the pitch control relative to manipulation of the cyclic controller 109, while the horizontal axis of display 403 represents the aircraft yaw control relative to manipulation of pedal 111. Display 403 provides significant advantages by displaying both yaw and pitch control relative to the control limits.

FIG. 4A shows display 403 having a flight control envelope 407 defined by the aircraft control limits 409, represented as a solid line. It should be understood that control limits 409 are either design flight limits established for the particular flight capabilities of the aircraft or limits imposed by the CPMS. For example, other rotary aircraft could include flight control limits having a smaller generally rectangular shape profile in lieu of the larger octagonal shape profile of the preferred embodiment. It should be appreciated that display 403 is adapted to display any flight control limit of the rotary aircraft.

Flight control envelope 407 comprises a first region 411, wherein the flight control limits are not modified by CPMS, as will be explained more fully below. Flight control envelope 407 further comprises a second region 413, specifically, a total of four of second regions 413 are disposed within region 411. In the exemplary embodiment, region 413 is defined with a dashed line 415. In region 413, the aircraft is operating in or near impending hazardous conditions, i.e., excessive flapping, and the flight control limits are modified by CPMS.

FIG. 4B shows first flight control envelope 407 transitioning to a second flight control envelope 417. The morphing of first control envelope 407 occurs when the aircraft nears impending hazardous flight conditions. In the second flight control envelope 417, region 411 remains unaffected by CPMS. It should be understood that display 403 continuously and interchangeably displays transition between envelopes 407 and 417.

FIG. 4C shows a third flight control envelope 419, which is an ultimate shape of display 403 during impending hazardous flight conditions, wherein the entire available control envelope is limited by CPMS. Flight control envelope 419 includes a dashed line 421 forming a region therein for cueing the pilot to exercise caution to avoid flight control limits. The region delineates a safe margin for controlling the aircraft without consideration of approaching an unsafe operating condition.

It should be understood that the flight control envelopes disclosed herein are generated by the aircraft control limits modified by control limits established by CPMS, which are continuously calculated based upon blade flapping and actuator movement. Thus, the general shape and size of the envelopes vary. For example, in FIG. 5, region 413 is shown having a width W, which increases in length during high blade flapping and decreases in length with low blade flapping. Such features enable the pilot to effectively manipulate the controllers to avoid excessive flapping.

It should also be appreciated that Display 403 continuously transitions between flight control envelopes 407 and 419 depending on the constraints imposed by CPMS, wherein flight control envelope 407 represents minimal CPMS limiting while envelope 419 represents maximal CPMS limiting. It should be understood that FIG. 4B is one of many possible flight envelopes created as the aircraft transitions between normal flight, i.e. first flight control envelope 407, to an impending hazardous condition, i.e., third fight control envelope 419. It should be noted that the horizontal and vertical lines of flight control limits 409 changes during transitioning between envelopes. For example, a comparison of FIGS. 4A and 4B illustrates flight control limits 409 having a shorter horizontal and vertical length as the flight envelope morphs when the aircraft approaches impending hazardous flight conditions.

Both flight control envelopes 407 and 419 create respective octagonal and diamond geometric shapes in the exemplary embodiments. Of course, it should be appreciated that alternative embodiments could include different geometric shapes depending on the desired limits and depending on the flight characteristics of the aircraft.

Figure 6:
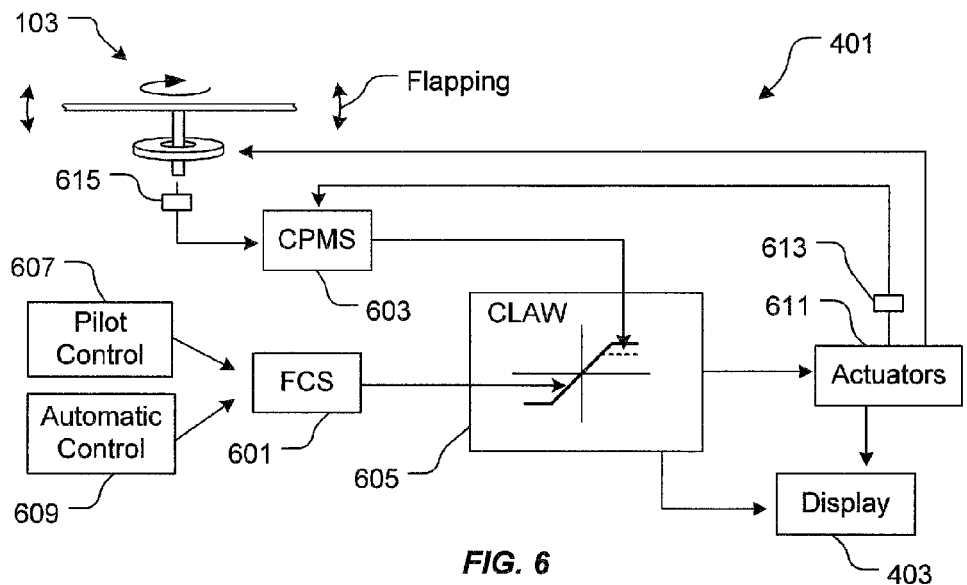
FIG. 6 is a schematic of the flight control system according to the preferred embodiment of the present application.

Referring to FIG. 6 in the drawing, a schematic view of flight control system 401 is shown. System 401 further comprises a flight control subsystem (FCS) 601 and a control power management subsystem 603 (CPMS). Both FCS 601 and CPMS 603 are operably associated with one another to assist the pilot to avoid excessive flapping.

Box 605, labeled as flight control laws (CLAW), depicts the outcome flight control limits generated by both FCS 601 and CPMS 603. As is shown, a solid line represents the original flight control limits, while the dashed line represents the modified flight control limits, i.e., the solid line being lowered with application of CPMS 603. It should be understood that CPMS 603 only limits the flight control limits while the aircraft is flying in or near impending hazardous flight conditions, i.e., excessive blade flapping. The modified flight control limits are thereafter displayed with display 403.

In the preferred embodiment, pilot controller commands 607, i.e., from cyclic controller 109 and/or pedal 111, along with automatic aircraft controls 609, are received by FCS 601, then relayed to aircraft actuators 611. The positioning of the actuators 611 are shown by symbol 405 on display 403.

CPMS 603 is preferably operably associated with a first sensor 613 adapted to sense displacement movement of actuators 611 and a second sensor 615 adapted to sense blade flapping of rotary system 103. CPMS 603 is provided with a flapping limiting algorithm, which receives sensed data from both sensor 613 and sensor 615 to generate control limit envelopes (See, FIGS. 4A-4C). As discussed, the flapping magnitude and actuator displacement changes during flight, thus resulting in changing control limits generated by CPMS 603.

Figure 7:
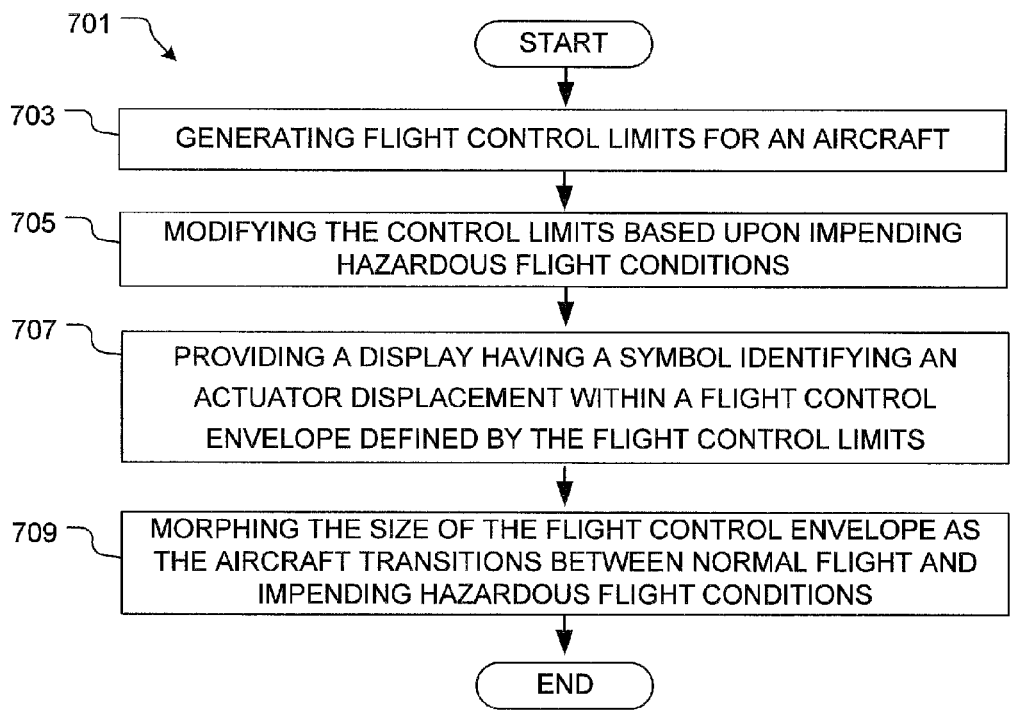
FIG. 7 is a flow chart depicting the preferred method according to the preferred embodiment of the present application.

Referring to FIG. 7 in the drawings, a flowchart 701 depicting the preferred method is shown. Box 703 shows the first step, which includes generating control limits for the aircraft, which are predetermined control limits for the particular aircraft. In the preferred method, the combined commanded pilot controls and the automatic aircraft controls are limited by the flight control margins. Box 705 depicts the next step, which includes modifying the control limits to avoid impending hazardous conditions, i.e., excessive flapping. This step is achieved with CPMS via a flapping limiting algorithm operably associated with the aircraft rotary system and the aircraft actuators. A display is provided to display the flight control envelope defined with the flight control limits, as depicted in box 707. A symbol is also utilized to show the controller displacement relative to the control limits. The next step morphing the envelope as the aircraft approaches impending hazardous flight conditions, as depicted in box 709.

Figure 8:
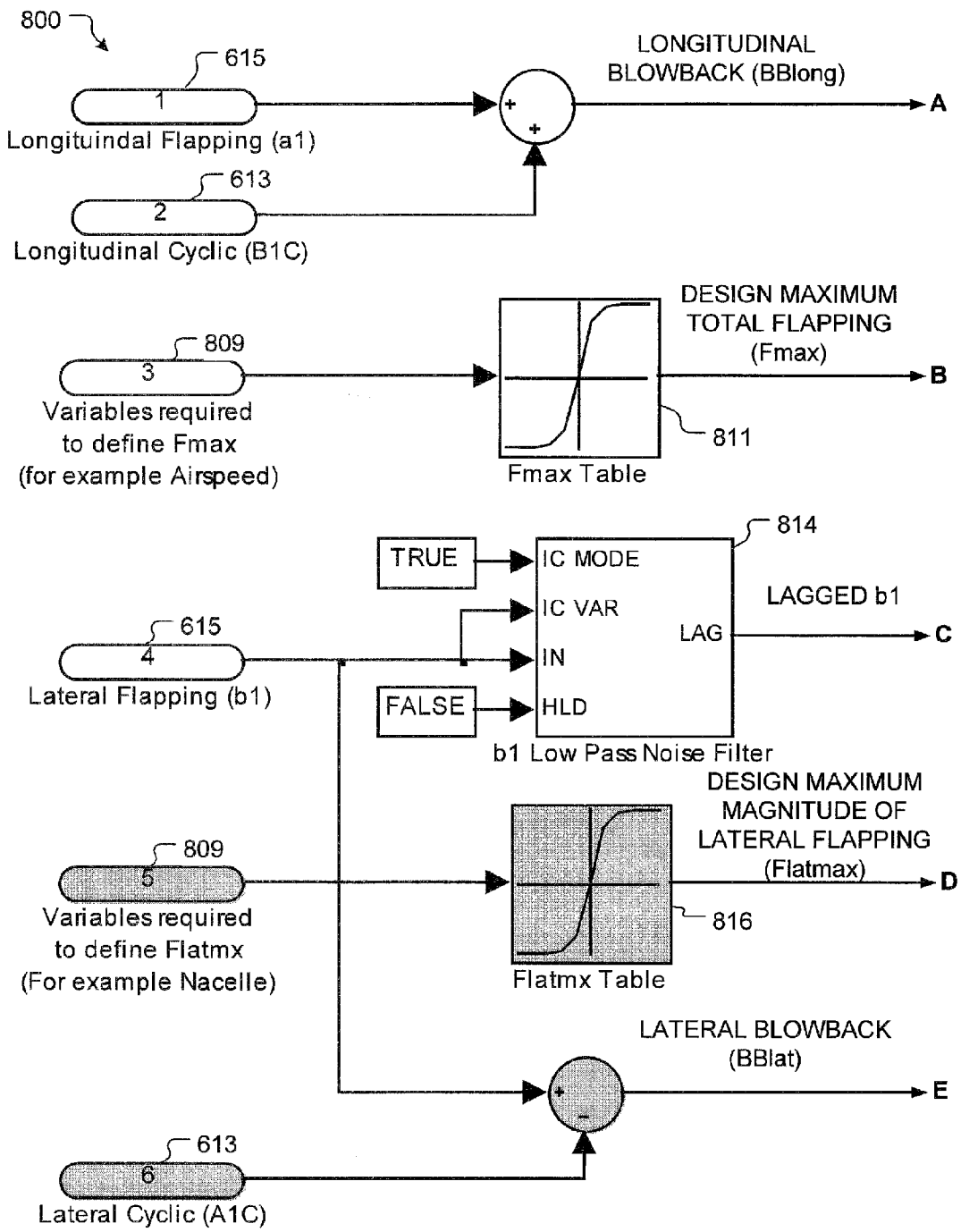
FIG. 8 is a schematic of the control power management subsystem (CPMS)
Figure 8:
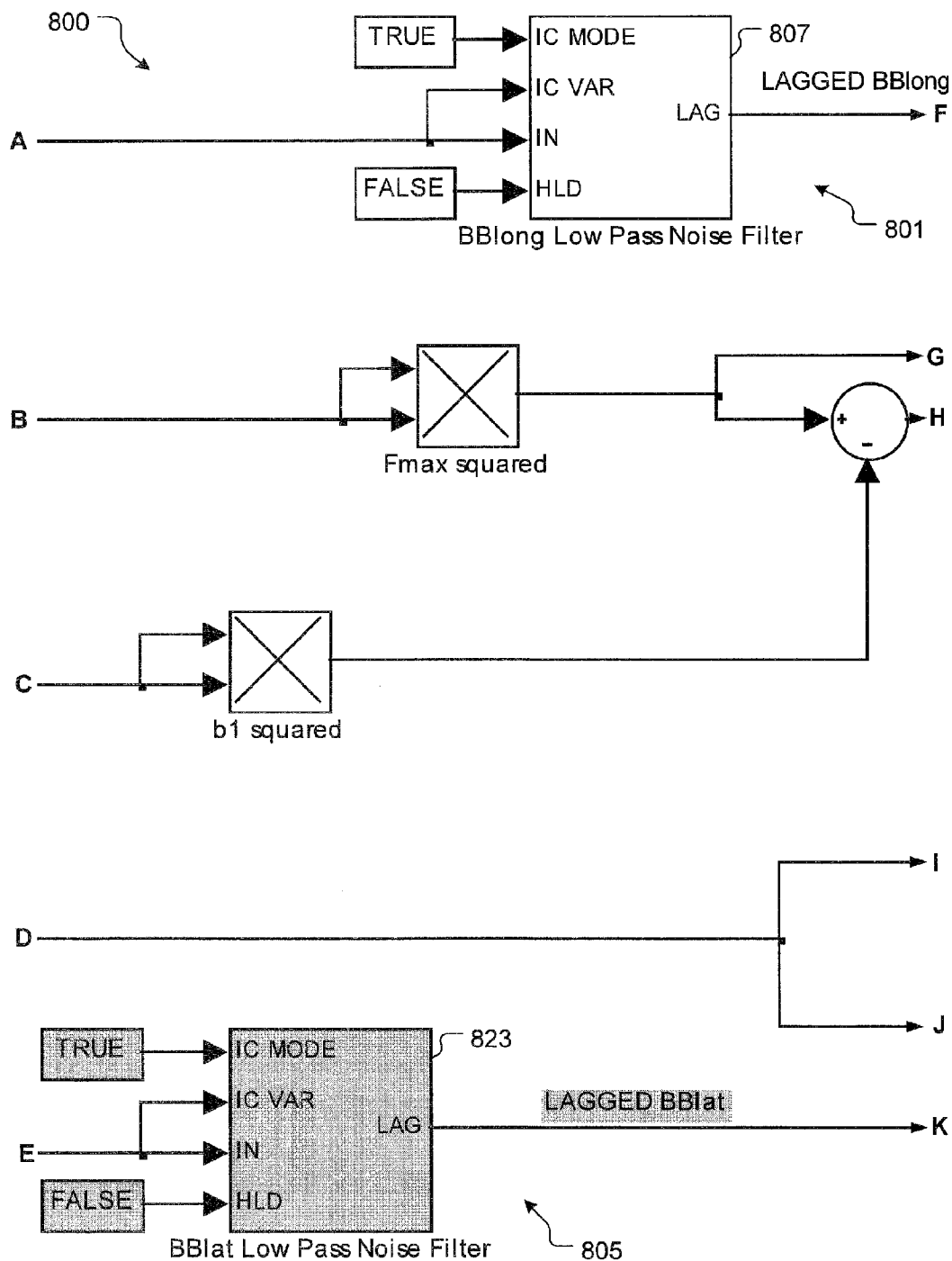
Figure 8:
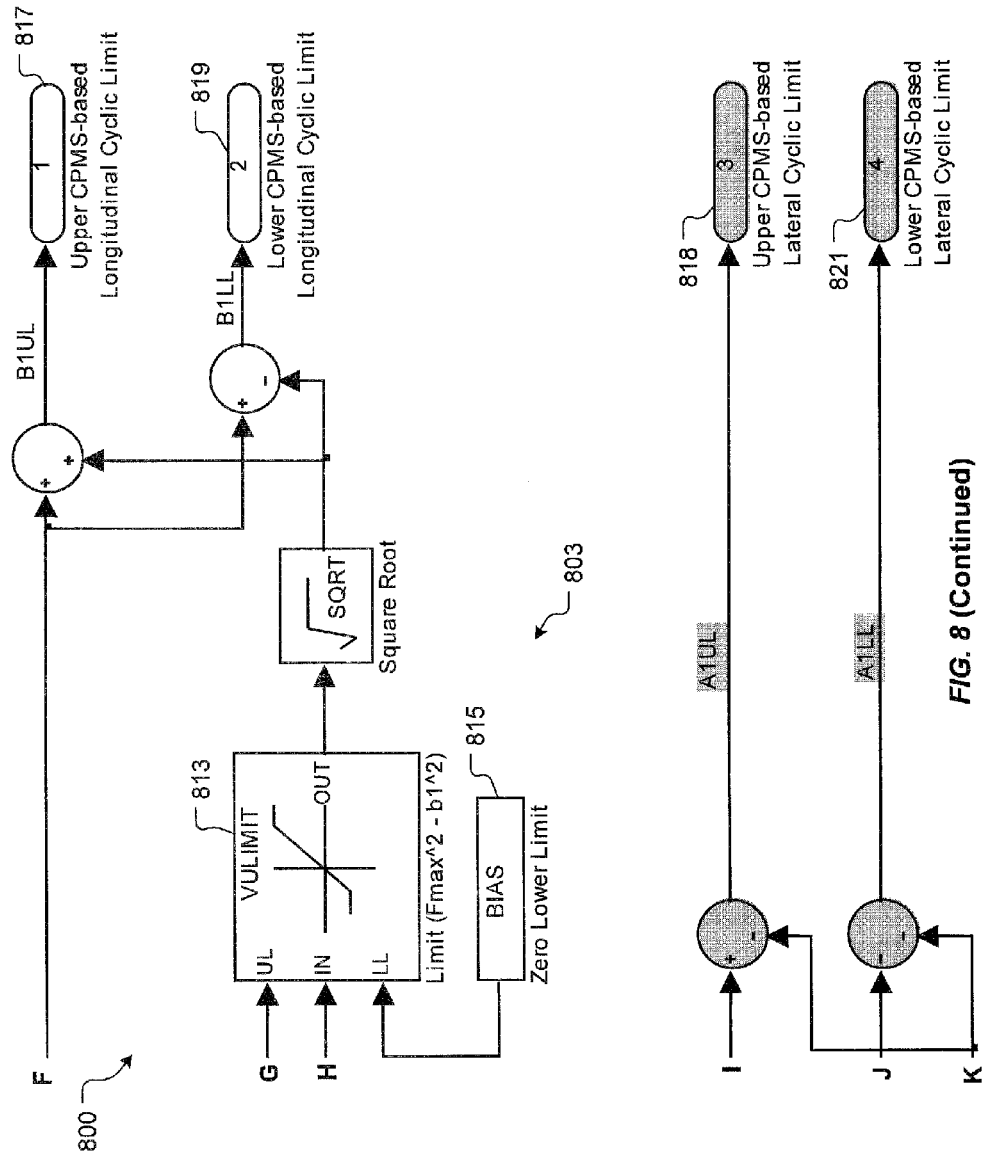

Turning next to FIG. 8 in the drawings, a schematic view of CPMS 603 is shown. The CPMS comprises one or more of a sensor for determining flapping and an algorithm configured to set control limits to prevent rotor flapping into mechanical stops or exceeding a design flapping limit by computing dynamic limits on longitudinal and lateral cyclic control inputs. In the preferred embodiment, the control system is utilized on tiltrotor aircraft which has a fixed lateral. However, it will be appreciated that the control system is configured for use with different types of rotary aircraft with variable control of both lateral and longitudinal cyclic.

FIG. 8 (subsystem 800) provides a detailed view of the algorithm utilized with subsystem 603. In particular, the algorithm is implemented in the flight control system software and receives data such as airspeed, longitudinal and lateral flapping, and the position of the lateral and longitudinal cyclic actuators as inputs. Thereafter, the algorithm generates CPMS-based cyclic control limits which may in turn limit the cyclic control commands of the flight control system. It should be appreciated that the algorithm is repeated for each rotor when implemented on a tiltrotor aircraft.

Subsystem 800, which is preferably subsystem 603, comprises one or more of a first control loop 801 configured to determine a longitudinal blowback value, a second control loop 803 configured to determine a design maximum total flapping value and a lateral flapping value, and a third control loop 805 configured to determine a lateral blowback value and value of design maximum magnitude of lateral flapping. In the preferred embodiment, control loop 805 is an optional control loop. For example, in some embodiments the rotary aircraft could include fixed lateral cyclic controlling. However, it should be appreciated that control system 401 is configured to include an algorithm for both lateral and longitudinal cyclic limiting, as depicted in FIG. 8.

Control loop 801 receives sensed longitudinal cyclic data from the actuator sensor 613 and longitudinal flapping data from the flapping sensor 615. The sensed data are summed to generate longitudinal blowback and then passed through a low pass noise filter 807, to create a lagged blowback value. Equation (1) shows the longitudinal blowback value.

$$BB_{long} = a_1 + B_{1C} \tag{1}$$

where BB_long is the longitudinal component of blowback, a__1 is the longitudinal component of flapping, and B__1C is the longitudinal component of the cyclic control.

It should be understood that blowback is a phenomenon affecting the rotor of a helicopter as it overcomes dissymmetry of lift through flapping. In forward flight, rotor blades experience more lift as they rotate forward. This increased lift is a result of an increased relative speed causing the blade to flap up and decrease its angle of attack. As the blade continues to rotate, it achieves its maximum upward flapping displacement over the nose of the aircraft and maximum downward flapping displacement over the tail. This results in the rotor disk being tilted to the rear and is referred to as blowback, as if the rotor disk had flapped or tilted back, or as if it had been blown back by the relative wind. The effect is more pronounced at higher airspeeds but more easily recognized as the aircraft accelerates to translational lift airspeeds from a hover. Blowback results in a slowing of the aircraft and the pilot counters the effect by applying forward input to the cyclic control.

Control loop 803 is configured to determine a design maximum total flapping Fmax value and a lateral component of flapping value. Specifically, control loop 803 receives input variables from a third sensor 809, e.g., airspeed or orientation of the tiltrotor nacelles, which in turn are compared to flight test input parameters in table 811. The compared input variables determine a design maximum total flapping Fmax value. The square value of Fmax is a upper flight control limit, as shown in diagram 814. Diagram 814 includes a lower flight control limit created by bias 815, which is preferably a zero value. Equations (2) and (3) show the values for the upper and lower limits, respectively, for diagram 813.

$$UL = F_{max}^2 \quad (2)$$

$$LL = 0 \quad (3)$$

where UL is the upper limit, LL is the lower limit, and F_max is the design maximum total flapping.

In the exemplary embodiment, table 811 includes a plurality of designated values for determining total flapping. During aircraft development, table 811 is preferably operably associated with a device positioned in the cockpit of the aircraft, which can be manually adjusted during flight. It will be appreciated that alternative embodiments could include Fmax tables that are autonomously adjusted by a flight control system. Further, the ultimate alternative embodiment is fixed Fmax values determined by the preferred aircraft development embodiment.

It should be noted that F_max is a function of aircraft variables (e.g., airspeed, nacelle) and tuned using empirical data and knowledge of the accuracy of the flapping measurements and the flapping stop limit. In the preferred aircraft development embodiment, F_max is the only tuning parameter required to guarantee that the design maximum total flapping values in Table 811 will be constant for all combinations of BB_long and Ideally, the single tuning parameter of the algorithm, Fmax, would be set to the design flapping limit. In practice, however, Fmax must be set to be less than the design limit based on considerations of flapping measurement accuracy and flight test results. In the preferred embodiment, Fmax is generally a function of airspeed. However, it will be appreciated that Fmax could be a function of other flight parameters. With provisions in the developmental flight control system to vary parameters in flight, Fmax can be rapidly and efficiently tuned to accommodate the flapping occurring in the worst case maneuvers expected of the aircraft.

Referring back to FIG. 8, the lateral component of flapping is sensed from flapping sensor 615, which later passes through a low pass filter 814. Thereafter, the lateral component of flapping is squared and subtracted from the Fmax squared to calculate an input control value. It should be noted that the input control value for diagram 813 cannot exceed the upper limit (UL in equation (2)) established by Fmax squared and cannot be lower than the lower limit (LL in equation (3)) established by bias 815. The output value from diagram 813 is squared prior to creating an upper CPMS-based longitudinal cyclic limit 817 and a lower CPMS-based longitudinal cyclic limit 819. Equations (4) and (5) show the input limit value and the output limit value, respectively.

$$IN = F_{max}^2 - b_1^2 \quad (4)$$

$$OUT = \lim(F_{max}^2 - b_1^2) \quad (5)$$

where b_1 is the lateral component of flapping, IN is the input control limit value, and OUT is the output control limit value.

The upper CPMS-based longitudinal cyclic limit 817 is calculated as the summation of BB_long and the square root value of OUT, while the lower CPMS-based longitudinal cyclic limit 819 is calculated as BB_long less the square root value of OUT. Equations (6) and (7) show the upper and lower limits of CPMS-based longitudinal cyclic limits, respectively.

$$B_{1UL} = BB_{long} + \sqrt{OUT} = BB_{long} + \sqrt{\lim(F_{max}^2 - b_1^2)} \quad (6)$$

$$B_{1LL} = BB_{long} - \sqrt{OUT} = BB_{long} - \sqrt{\lim(F_{max}^2 - b_1^2)} \quad (7)$$

where B_1UL is the upper CPMS-based longitudinal cyclic limit and B_1LL is the lower CPMS-based longitudinal cyclic limit and where a_1, b_1, and B_1C are assumed to be available as sensed inputs.

The above equations can be rearranged to arrive at the following equations (8)-(10). The first step requires the combination of F_max and CM_long equations and then to solve for B_1LIM.

$$F_{max}^2 = (a_1 + CM_{long})^2 + b_1^2 \quad (8)$$

$$CM_{long} = -a_1 \pm \sqrt{(F_{MAX}^2 - b_1^2)} = B_{1C} - B_{1LIM} \quad (9)$$

$$B_{1LIM} = B_{1C} + a_1 \pm \sqrt{(F_{MAX}^2 - b_1^2)} = BB_{long} \pm \sqrt{(F_{MAX}^2 - b_1^2)} \quad (10)$$

where B_1LIM=CPMS-based longitudinal cyclic command limit and CM_long is the control margin for longitudinal flapping.

It should be noted that the upper CPMS-based longitudinal cyclic limit is defined by the "+" sign on the SQRT function and the lower limit is defined by the "−" sign.

Control loop 805 is an optional feature of system 401. Control loop 805 includes a table 816, which receives one or more variables from sensor 809 to determine a design maximum magnitude lateral component of flapping Fmaxlat. Control loop 805 utilizes the lateral component of flapping and lateral blowback to calculate the upper CPMS-based lateral cyclic limit 818 and the lower CPMS-based lateral cyclic limit 821.

The lateral blowback is the lateral component of flapping less the lateral cyclic. Equation (11) shows the lateral blowback.

$$BB_{lat} = b_1 - A_{1C} \quad (11)$$

where BB_lat is the lateral component of blowback and A_1C is the lateral component of cyclic control.

The lateral component of blowback passes through a low-pass filter 823 prior to being subtracted from the design maximum magnitude of lateral flapping Fmaxlat. Equations (12) and (13) show the upper CPMS-based lateral cyclic limit 818 and the lower CPMS-based lateral cyclic limit 821, respectively.

$$A_{1UL} = F_{lat\,max} - BB_{lat} = F_{lat\,max} - (b_1 - A_{1C}) \quad (12)$$

$$A_{1LL} = -F_{lat\,max} - BB_{lat} = -F_{lat\,max} - (b_1 - A_{1C}) \quad (13)$$

where A_1UL is the upper CPMS-based lateral cyclic limit, A_1 LL is the lower CPMS-based lateral cyclic limit, and F_latmax is the design maximum magnitude of lateral flapping.

In the exemplary embodiment, the magnitude of F_latmax will be less than the magnitude of F_max and will be a function of aircraft flight variables (e.g., airspeed, nacelle rotation) from sensor 809 and tuned using empirical data and knowledge of the accuracy of the flapping measurements.

The above equations can be rearranged to arrive at equations (14)-(16) below.

$$F_{lat\,max} = b_1 + CM_{lat} \quad (14)$$

$$CM_{lat} = F_{lat\,max} - b_1 = A_{1LIM} - A_{1C} \quad (15)$$

$$A_{1LIM} = A_{1C} - b_1 + F_{lat\,max} = -BB_{lat} + F_{lat\,max} \quad (16)$$

where A__1 LIM is the CPMS-based lateral cyclic command limit and CM_lat is the control margin for lateral flapping.

It should be noted that the design maximum magnitude of lateral flapping needs to be considered for both positive and negative values of b__1 for upper and lower limit calculations, as shown and described above.

The control system is unique and novel in that it provides a simple, easily optimized, and effective method to control total flapping (having both longitudinal and lateral components) of a rotor with longitudinal and lateral cyclic control. The control system provides the requisite limiting without compromising vehicle control. It can be modified to accommodate independent lateral cyclic control. But, if it is decided that the additional control degree of freedom is not required, then reductions in weight, cost, and complexity will be realized.

Figure 9:
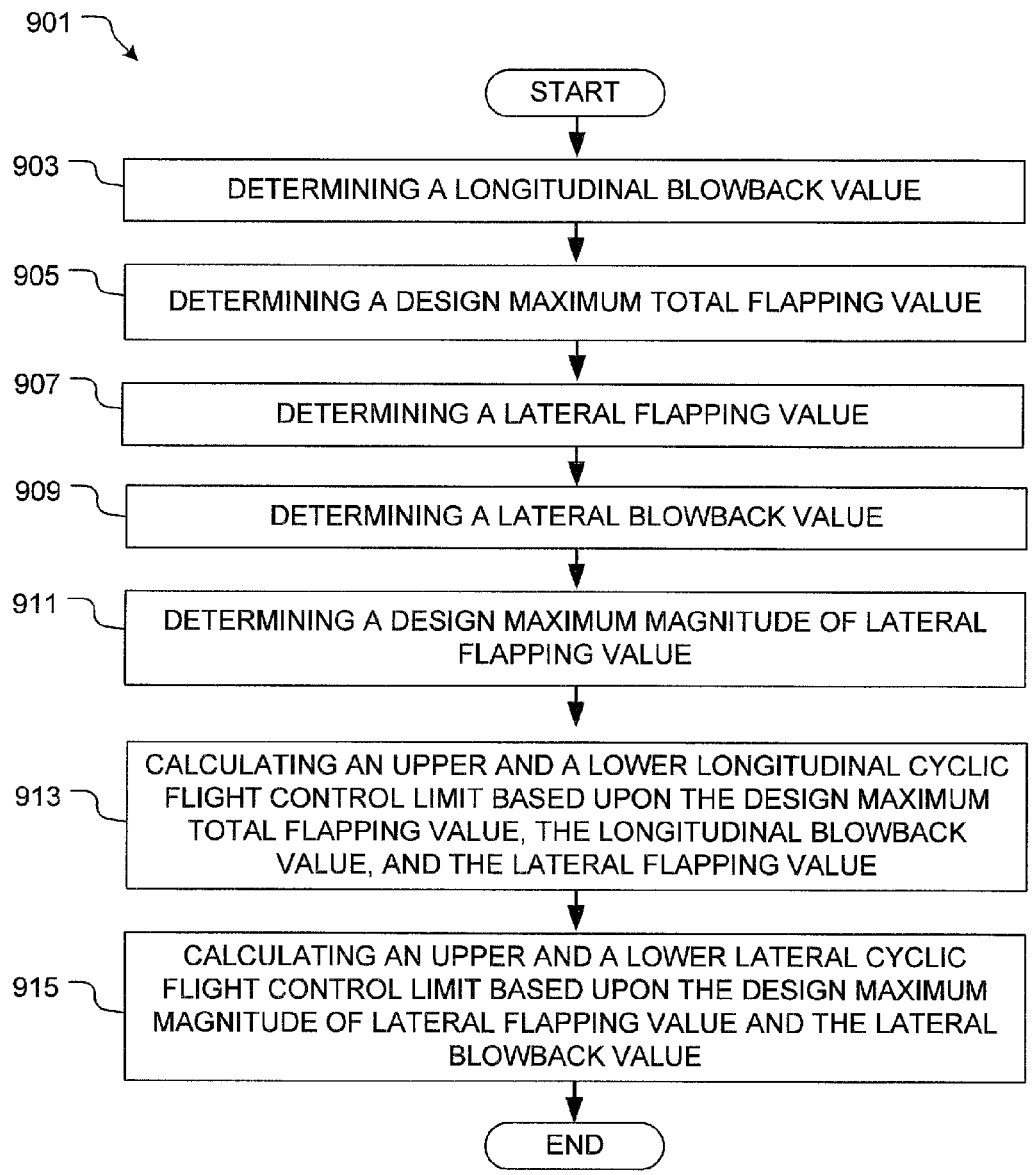
FIG. 9 is a flow chart depicting the preferred method.

Referring next to FIG. 9 in the drawings, a flowchart 901 depicting the preferred process of implementing the control system algorithm is shown. Boxes 903 through 911 depict the first steps of the process, which includes determining input values such as blowback and flapping. These values, including the process of obtaining them, are described in detail above, and for simplicity, are not disclosed here. Thereafter, the cyclic control limits are calculated by utilizing the sensed input blowback and flapping values, as depicted in boxes 913 and 915. It should be noted that boxes 909, 911, and 915 describe an optional feature of the preferred embodiment, wherein the upper and lower lateral cyclic limits are calculated when the lateral cyclic controlling is not fixed.

It should be noted that flowchart 901 depicts a broad overview of the preferred process, and a detail overview of the preferred method is discovered when viewing FIG. 8 in conjunction with FIG. 9. For example, the process of determining the longitudinal blowback value, as depicted in box 903 of FIG. 9, is clearly shown in control loop 801 of FIG. 8.

It is apparent that a system and method having significant advantages has been described and illustrated. The particular embodiments disclosed above for a tiltrotor are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

What is claimed is:

1. A control system for a rotary aircraft, comprising:
a first loop configured to provide a longitudinal blowback value of a rotor blade during flight; and
a second loop associated with the first loop, the second loop being configured to provide a design maximum total flapping value and a lateral flapping value;
wherein the squared value of the lateral flapping value is subtracted in the control system from the squared value of the design maximum total flapping value to create a fight control limit;
wherein the flight control limit is added to the longitudinal blowback value to create an upper longitudinal cyclic limit; and
wherein the flight control limit is subtracted from the longitudinal blowback value to create a lower longitudinal cyclic limit.

2. The control system of claim 1, further comprising:
a display configured to display a symbol identifying the displacement of the controller relative to the upper longitudinal cyclic limit and the lower longitudinal cyclic limit.

3. The control system of claim 1, further comprising:
a first sensor associated with the cyclic actuators of the rotary aircraft, the sensor being configured to detect a displacement of the actuators;
a second sensor associated with a rotor of the rotary aircraft, the second sensor being configured to detect a lateral flapping movement and a longitudinal flapping movement of the rotor blade; and
a third sensor associated with the rotary aircraft, the third sensor being configured to detect a flight parameter of the aircraft;
wherein the first loop is associated with the first sensor and the second sensor; and
wherein the second loop is associated with the second sensor and the third sensor.

4. The control system of claim 3, further comprising:
a table of flapping values, the table being associated with the second loop;
wherein the flight parameter sensed by the third sensor is received by the table of flapping values and compared with the designated flapping values to determine the design maximum total flapping value.

5. The control system of claim 4, wherein the flight parameter is the aircraft airspeed.

6. The control system of claim 4, wherein the table of design maximum flapping values is manually adjusted during flight.

7. The control system of claim 4, further comprising:
a third loop operably associated with the first sensor and the third sensor, the third loop being configured to determine a lateral blowback value created by the rotor blade during flight and a value of design maximum magnitude of lateral flapping.

8. The control system of claim 4, the third loop comprising:
a table of lateral flapping values;
wherein the flight parameter sensed by the third sensor is received by the table of lateral flapping values and compared with the designated flapping values to determine the design maximum magnitude of lateral flapping value.

\* \* \* \* \*